Dec. 14, 1954     O. H. BJORK     2,696,704
MOUNTING FOR TRACTOR MOWERS

Filed April 25, 1952     3 Sheets-Sheet 1

INVENTOR
Orville H. Bjork
BY
McMorrow, Berman & Davidson
ATTORNEYS.

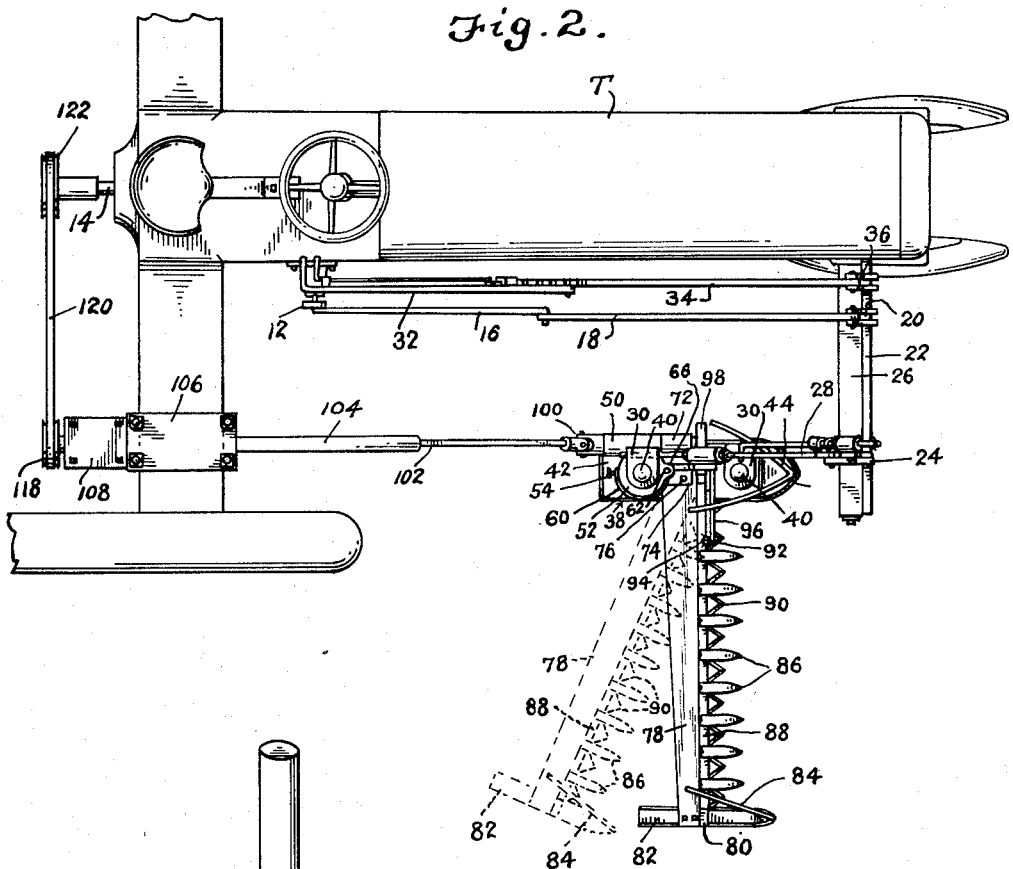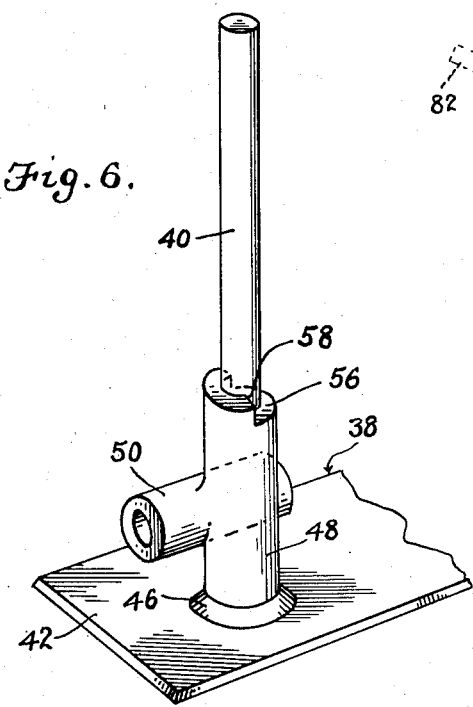

Dec. 14, 1954  O. H. BJORK  2,696,704
MOUNTING FOR TRACTOR MOWERS
Filed April 25, 1952  3 Sheets-Sheet 3

INVENTOR
Orville H. Bjork
BY
McMorrow, Berman & Davidson
ATTORNEYS.

United States Patent Office 2,696,704
Patented Dec. 14, 1954

2,696,704

MOUNTING FOR TRACTOR MOWERS

Orville H. Bjork, Paullina, Iowa

Application April 25, 1952, Serial No. 284,322

5 Claims. (Cl. 56—25)

This invention relates to implements of the type falling into the broad category of tractor attachments. More specifically, the invention has reference to a mowing attachment for a tractor or like vehicle. Still more specifically, the present invention refers to a mowing attachment so designed as to be mountable on the conventional cultivator support frame of a tractor, and further designed to include a sickle of the reciprocating type adapted to be operatively connected by an appropriate motion-transmitting linkage, to the conventional rotating power take-off shaft of the tractor.

One of the main purposes of the present invention is to provide a mowing attachment of the character referred to that will be particularly adapted for fence-row mowing. Fence-row mowing operations are carried on, generally, during the cultivating season and it will be appreciated that during this season, the conventional cultivator support frame will usually be left in proper position upon a tractor. Accordingly, it is proposed to provide a mowing attachment which will be so designed as to be connectible directly to the cultivator support frame, so that one desiring to make use of the mowing attachment need only detach the standards extending upwardly from the ordinary cultivator shovels, from the clamps provided on the cultivator support frame, and then position the standards provided on the mowing attachment within said clamps. To complete the mounting of the mowing attachment on the tractor, it is proposed to provide an arrangement wherein a suitable driving linkage provided upon the attachment can be secured readily to the power take-off shaft of the tractor.

Once mounted upon the cultivator support frame, the mowing attachment constituting the present invention would be adjustable relative to the ground in the same manner as the cultivator normally carried by said frame, that is, the cultivator support frame adjusting means ordinarily provided upon the tractor will become adapted automatically for first, raising the mowing attachment bodily above the ground surface, and lowering the same into engagement with the ground surface when mowing operations are to be conducted; and second, adjusting the sickle, that forms a component part of the mowing attachment, into selected positions of tiltable adjustment relative to the ground surface after the first adjustment has been made.

In this way, it is proposed to carry out the main, broad object of the invention, which is to provide a construction that will permit the operating controls of one tractor attachment to be used to control the operation of another, different attachment.

A further important object of the present invention is to provide a mowing attachment of the type stated wherein the sickle bar will be adjustable not only in the manner referred to above, but will also be yieldably mounted for swinging movement in both horizontal and vertical planes, so as to yield in the path of obstructions encountered thereby, it being an object of the present invention to provide a sickle-reciprocating driving linkage so arranged as to transmit motion to the sickle in each position to which the assembly is adjusted by the cultivator frame adjusting means, as well as in each position to which the sickle bar is yieldably swung.

Summarized briefly, the mowing attachment constituting the present invention includes a pair of upstanding standards adapted to be secured to the cultivator support frame of any of various makes of tractors. The standards are secured fixedly, at their lower ends, to a ground-engaging runner, and rotatably mounted on one of the standards is a vertically disposed sleeve. The sleeve is rigid with a generally horizontal bearing, through which a drive shaft extends. A sickle bar extends laterally and outwardly from the standards, and is pivotally mounted on the drive shaft for swinging movement in a vertical plane, the rotatable mounting of the sleeve being effective to also permit movement of the sickle bar in a horizontal plane. Means is operatively associated with the sickle bar for retaining the same in its normal, horizontal position. Reciprocably mounted on the sickle bar is a sickle, and for the purpose of reciprocating the sickle in each position to which the sickle bar is adjusted or yieldably swung, a driving linkage is provided, that includes the drive shaft and extends to the conventional power take-off shaft of the tractor, said linkage being so arranged as to translate rotary motion of the power take-off shaft into reciprocating motion of the sickle.

Other objects will appear from the following description, the claims appended thereto, and from the annexed drawing, in which like reference characters designate like parts throughout the several views, and wherein:

Figure 2 is a top plan view, a portion of the tractor being broken away;

Figure 6 is an enlarged fragmentary perspective view of said one standard and of the sickle support means carried thereby;

Figure 7 is an enlarged bottom perspective view of a stop collar adapted to be mounted on said standard;

Figure 1:
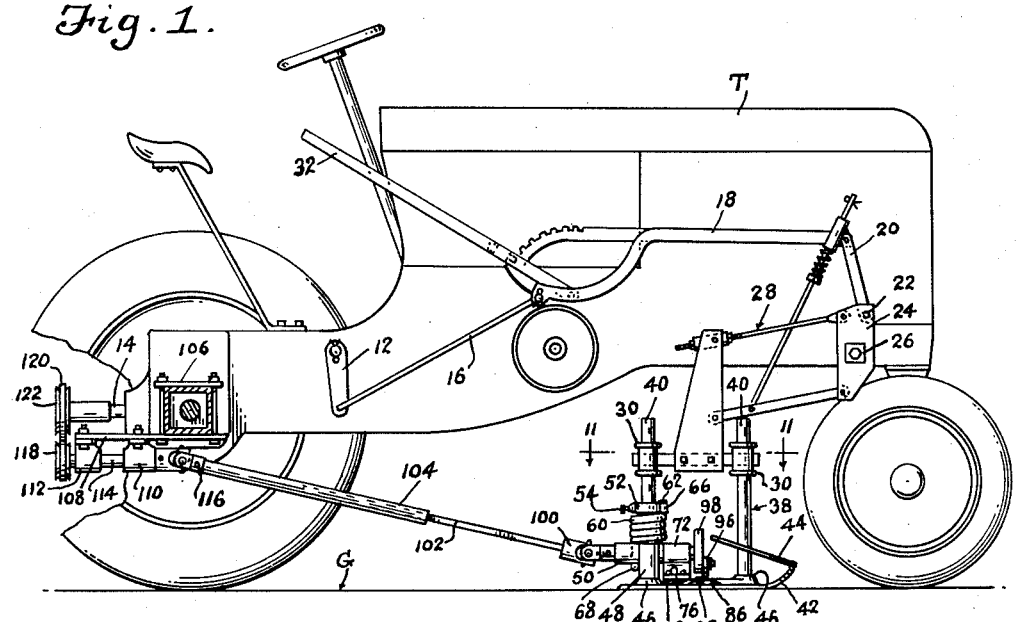
Figure 1 is a side elevational view of a mowing attachment formed in accordance with the present invention, as it appears when mounted upon a tractor, a portion of said tractor and of said mowing attachment being broken away.
Figure 4:
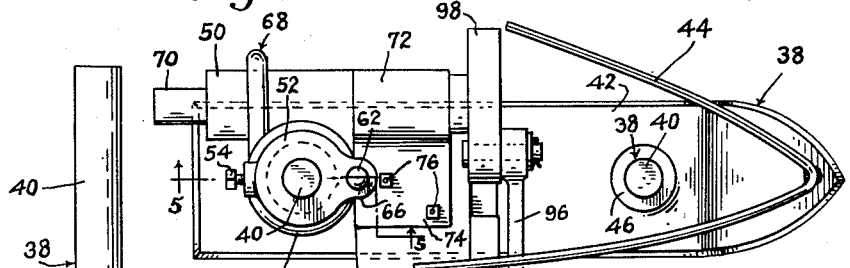
Figure 4 is an enlarged fragmentary top plan view of the attachment in which the driving linkage has been omitted, a portion of the mowing attachment being broken away.

Referring to the drawings in detail, the reference letter T has been applied to designate a conventional tractor, on which the mowing attachment constituting the present invention can be readily mounted. In this connection, it will be understood that the attachment can be so designed as to be mountable on any of various makes of tractors, the tractor illustrated being an example of only one of many tractors on which the mower can be used.

The tractor illustrated is provided with a wholly conventional cultivator support frame. The tractor is further provided with a conventional hydraulic lift arm 12, and a conventional, rotating, power take-off shaft 14.

Since the cultivator support frame is of conventional design, and is well known to those skilled in art, a detailed description thereof is unnecessary, and it is believed sufficient to describe merely the general arrangement of the parts of said support frame that necessarily cooperate with the invention, and the operating characteristics of said cooperating parts.

Thus, there is connected to the hydraulic lift arm 12 a control rod 16 attached to a connecting bar 18, said connecting bar 18 being connected at its front end to a swingable arm 20 attached, by means of a rock shaft 22, to spaced plates 24 rockably mounted upon a tool bar 26.

The respective plates 24 are each adapted to support a parallelogram linkage designated generally by the reference numeral 28. At its rear end, the linkage is provided with the usual spaced clamps 30, which ordinarily, are adapted to engage the upstanding standards of the cultivator shovel of a conventional cultivator attachment.

It will be understood that by operation of the hydraulic lift arm 12, the parallelogram linkage 23 is adjusted upwardly or downwardly, this adjustment being for the purpose of lifting a conventional cultivator attachment out of engagement with the ground surface G, and subsequently lowering said attachment into engagement with said surface.

The conventional cultivator support assembly further includes a manually operable lever 32 of the type including a detent engageable in a selected notch of a quadrant provided upon a depth adjustment arm 34.

All the above description refers to a thoroughly conventional construction of a cultivator support frame and its associated adjusting mechanism, such as is found on any of various makes of tractors. It may be noted that while a typical frame and adjusting mechanism has been illustrated by way of example in the drawings, said frame might vary, according to the make of tractor, and in some instances, the spacing of the clamps 30 might be varied, as well as the particular formation of said clamps. In such instances, of course, the upstanding standards of the mowing attachment, that are engageable by the clamps 30, might be varied in respect to the spacing thereof, and might also be of a different design, so far as their cross sectional configuration, length, etc. are concerned.

The mowing attachment constituting the present invention has been designated generally by the reference numeral 38, and in the illustrated embodiment of the invention, includes a pair of spaced, upstanding standards 40 adapted to be extended into the clamps 30, and engaged fixedly by said clamps.

At their lower ends, the standards 40 are fixedly secured to an inner, ground engaging runner 42 the front end of which is curved upwardly and is provided with a generally V-shaped, rod-like, guard 44 designed to protect the driving mechanism of the mowing attachment. The runner, in this connection, is provided, at locations spaced longitudinally thereof, with sockets 46 receiving the lower ends of the standards 40, said standards being welded or otherwise fixedly retained within said sockets.

Figure 5:
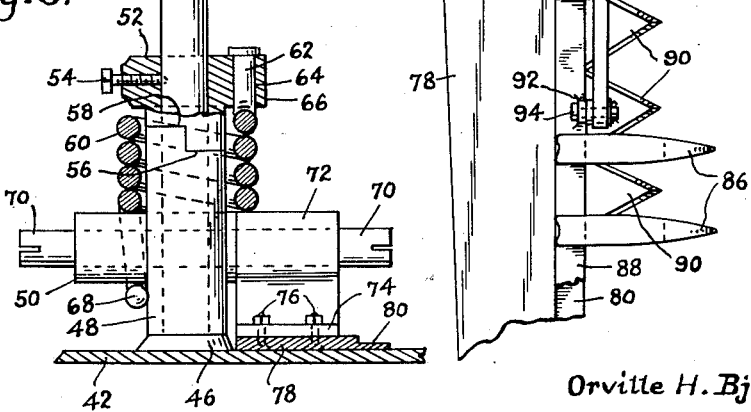
Figure 5 is an enlarged sectional view taken on line 5—5 of Figure 4, illustrating the mounting of the sickle bar on one of the standards of the mowing attachment.

On the rear standard, I mount an upstanding sleeve 48 (Figures 5 and 6), said sleeve being rotatable on the standard and engaging the socket 46 at its lower end. The sleeve 48, intermediate its opposite ends, is integral or otherwise made rigid with a bearing 50, said bearing being arranged normally to the sleeve.

Mounted upon the standard on which the sleeve 48 is positioned, immediately above the sleeve, is a collar 52, said collar being secured in a selected position on the standard by means of a set screw 54.

The collar 52 (Figure 7) is formed with a depending, centrally disposed projection, said projection being formed with a downwardly extended, arcuate shoulder 56 which, in the illustrated embodiment of the invention, extends through approximately 90 degrees of a circuit. The opposite ends of the shoulder 56 are adapted to engage the opposite ends of an upstanding, arcuate shoulder 58 formed upon the upper end of the sleeve 48 (Figure 6), the arcuate shoulder 58 extending through approximately 180 degrees. Thus, rotatable movement of the sleeve 48 in opposite directions is limited, by engagement of the respective ends of the stop shoulder 58 against the respective ends of the stop shoulder 56 of the collar 52.

Coiled about the sleeve 48 (Figure 5) is a heavy spring 60, said spring being held under compression between the collar 52 and the bearing 50. One end 62 of the spring is projected upwardly through an opening 64 formed in a laterally projected lug 66, that is integral with the collar 52, said end 62 of the spring being peened over to secure the spring to the collar. The other end 68 of the spring is extended partially about the bearing 50.

As a result, if the sleeve 48 and bearing 50 are rotated clockwise when viewed as in Figure 2, the spring 60 will be effective to return the sleeve and bearing to their normal position, after said clockwise movement.

Journaled in the bearing 50 is a drive shaft 70, and pivotally mounted on one end of said drive shaft, for swinging movement in a vertical plane, is a sickle bar support comprising a sleeve member 72 integral with a flat plate 74. The plate 74 is apertured to receive bolts 76, whereby said plate is fixedly secured to one end of an elongated, flat sickle bar 78 having a shallow longitudinal recess 80 in its forwardly disposed edge. The sickle bar overlies the runner 42, and at its outer end, is fixedly attached to an outer runner 82 the front end of which is curved upwardly and is provided with a rearwardly extended, rod-like guard member 84. Normally, the sickle bar, and the parts carried thereby, is disposed substantially horizontally (see the full line position of said bar in Figure 3). Further, in the normal position of the sickle bar, said sickle bar is arranged substantially in perpendicular relation to the path of movement of the tractor, this arrangement being illustrated in full lines in Figure 2. However, by reason of the pivotal mounting of one end of the sickle bar upon the drive shaft 70, the sickle bar can yield upwardly as shown in the dotted line position of Figure 3. Further, by reason of the rotatable mounting of the sleeve 48 upon the standard 40, the sickle bar can swing rearwardly in a horizontal plane, as shown in the dotted line position in Figure 2. It may be noted, in this connection, that the spring 60 will be effective to return the sickle bar from the dotted line position to the full line position thereof illustrated in Figure 2, and it will be further understood that when the sickle bar yields upwardly as shown in the dotted line position of Figure 3, it will tend to gravitate to its horizontal position.

This arrangement is of considerable importance in fence-row mowing, inasmuch as there are conditions which must be met in mowing operations of this type that are not, generally, present in open field mowing. In open field mowing, the ground is more even, and there are no obstructions, such as fence posts and the like. In a fence-row, however, higher ground prevails, since the soil from a plowed field, carried by the wind, will lodge on the unbroken sod adjacent the fence.

Figure 3:
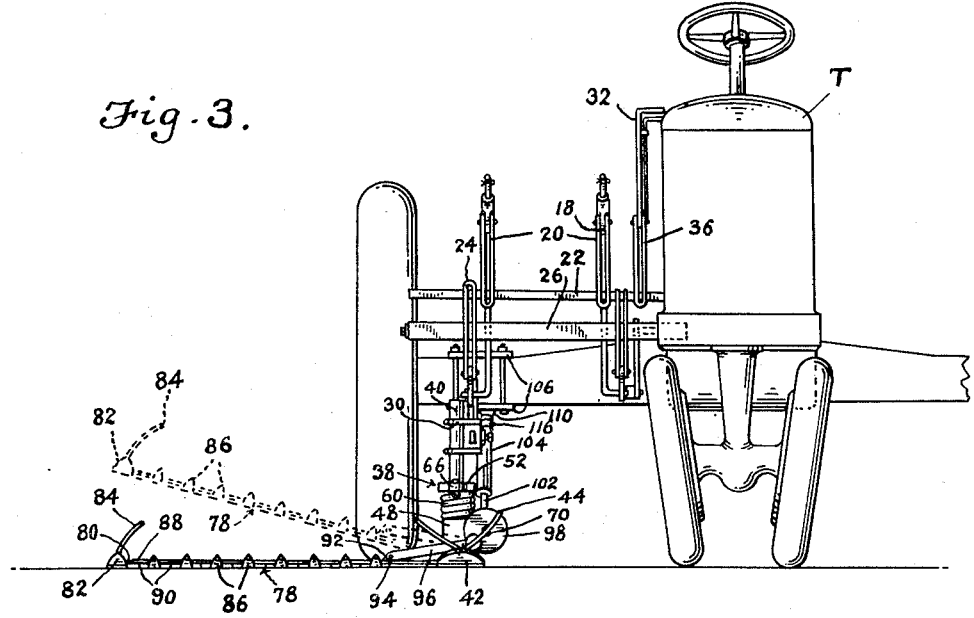
Figure 3 is a front elevational view in which part of the tractor has been broken away, the dotted lines indicating a position to which the mowing attachment may swing in a vertical plane.
Figure 8:
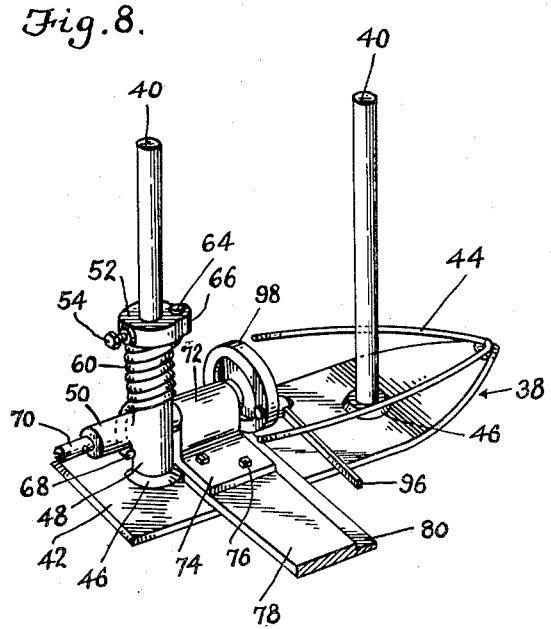
Figure 8 is an enlarged perspective view of the mowing attachment illustrating the mounting of the sickle bar and showing the driving connection for the sickle, portions being shown in section.
Figure 9:
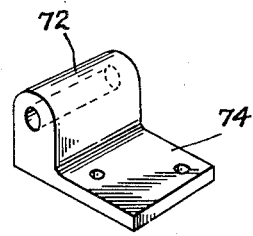
Figure 9 is an enlarged perspective view of the sickle bar support.

Because of the prevalence of obstructions such as fence posts, the sickle bar should be free to yield rearwardly in a horizontal plane in the manner illustrated in the dotted line position in Figure 2, and because of the uneven and generally higher ground which will prevail in a fence-row, the sickle bar should also be free to yield upwardly as in the dotted line position of Figure 3.

Formed on the forward edge of the sickle bar 78, below the longitudinal recess 80 thereof, is a longitudinal series of sharply pointed guard teeth 86, said teeth projecting a substantial distance beyond the forward edge of the sickle bar, and being of approximately V-shaped configuration when viewed in side elevation, so as to permit one end of each tooth to be secured to the underside of the sickle bar, and the other end to be secured to the upper surface of the sickle bar, above the longitudinal recess 80. The teeth 86, by reason of this construction, protect a sickle 88, said sickle being formed as an elongated, flat bar corresponding in cross sectional configuration to the cross sectional configuration of the recess 80, and reciprocably mounted in said recess. The sickle 88 is formed with a longitudinal series of sharply pointed teeth 90, said teeth being shorter in length than the guard teeth 86. Thus, the guard teeth 86 will condition the grass and weeds in the fence-row for engagement thereof by the teeth 90, and will also shield the sickle 88 and its associated teeth 90 from rocks, stones, and the like.

Formed upon the sickle 88, adjacent the inner end thereof, is an upstanding ear 92, apertured to receive a pivot pin 94, said pivot pin passing through the outer end of a pitman 96, that is pivotally connected at its other end to the marginal portion of a drive wheel 98. The drive wheel 98 is keyed or otherwise fixed to the rotatable drive shaft 70, and thus rotatable movement of the drive shaft will be translated into reciprocating movement of the sickle 88.

Provided upon the rearwardly disposed end of the drive shaft 70 is a universal joint 100, whereby the drive shaft is connected to a telescoping shaft 102 of square cross section, that telescopes within, and is rotatable with, a hollow shaft 104 the bore of which is complementary to the shaft 102.

On the rear axle housing of the tractor T, I mount a clamp 106 (Figure 1), whereby there is fixedly secured to the underside of said housing an elongated, flat, bearing plate 108.

Attached to the underside of the bearing 108, in coaxially aligned, spaced relation, are bearings 110, 112 respectively, in which is journaled a power transmission shaft 114 connected by a universal joint 116 to the rearwardly disposed end of the hollow shaft 104.

A pulley 118 is keyed or otherwise fixed to the shaft 114, and a belt 120 is trained about said pulley, and also about a pulley 122 secured to the power take-off shaft 14 of the tractor.

It is believed apparent that the construction illustrated and described shows clearly that the main principle of the invention is the provision of a power driven mower attachment for a tractor, that is attachable to the conventional cultivator support frame of the tractor, so as to be adjustable in the same manner as a cultivator that would normally be attached to said frame. In view of this arrangement, the sickle bar can be bodily shifted into and out of engagement with the ground surface G, and in any position to which it is bodily adjusted by means of the conventional cultivator support frame adjusting means, said sickle bar is free to yield in horizontal and vertical planes, on encountering obstructions in its path during mowing operations.

The cultivator support frame adjusting means provided on the tractor is further effective to permit the sickle bar to be tilted about its longitudinal center line, so as to adjust the same for depth of cut. This last adjustment is effected by manipulation of the hand lever 32.

It is also considered to be an important characteristic of the invention that the construction is basically simple in design, and yet is not only adapted to be attached to a cultivator support frame with ease and facility, but also is highly efficient during cutting operations, whether said operations be fence-row or open field mowing.

It is believed apparent that the invention is not necessarily confined to the specific use or uses thereof described above, since it may be utilized for any purpose to which it is suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a mower of the tractor-attached type, a cutting mechanism mounting comprising: a ground-engaging runner; standards extending upwardly therefrom for supporting the runner from a tractor; a sleeve receiving and rotatable upon one of the standards; a bearing rigid with and disposed normally to the sleeve; a shaft extending through the bearing; a sleeve member receiving and rotating upon the shaft; and means rigid with the sleeve member for fixedly attaching a cutting mechanism thereto.

2. In a mower of the tractor-attached type, a cutting mechanism mounting comprising: a ground-engaging runner; standards extending upwardly therefrom for supporting the runner from a tractor; a sleeve receiving and rotatable upon one of the standards; a bearing rigid with and disposed normally to the sleeve; a shaft extending through the bearing; a sleeve member receiving and rotating upon the shaft; means rigid with the sleeve member for fixedly attaching a cutting mechanism thereto; a collar fixed to the standard above the sleeve; and a spring coiled about the standard and connected at its ends to the collar and bearing respectively, the spring being under tension tending to unwind the same in a selected direction so as to yieldably exert pressure on the sleeve tending to rotate it in the same direction.

3. In a mower of the tractor-attached type, a cutting mechanism mounting comprising: a ground-engaging runner; standards extending upwardly therefrom for supporting the runner from a tractor; a sleeve receiving and rotatable upon one of the standards; a bearing rigid with and disposed normally to the sleeve; a shaft extending through the bearing; a sleeve member receiving and rotating upon the shaft; means rigid with the sleeve member for fixedly attaching a cutting mechanism thereto; a collar fixed to the standard above the sleeve; and a spring coiled about the standard and connected at its ends to the collar and bearing respectively, the spring being under tension tending to unwind the same in a selected direction so as to yieldably exert pressure on the sleeve tending to rotate it in the same direction, the collar being formed with a depending shoulder, the sleeve being formed at its upper end with a shoulder engaging the first shoulder to limit rotation of the sleeve in opposite directions.

4. In a mower of the tractor-attached type, a cutting mechanism mounting comprising: a ground-engaging runner; standards extending upwardly therefrom for supporting the runner from a tractor; a sleeve receiving and rotatable upon one of the standards; a bearing rigid with and disposed normally to the sleeve; a shaft extending through the bearing; a sleeve member receiving and rotating upon the shaft; means rigid with the sleeve member for fixedly attaching a cutting mechanism thereto; a collar fixed to the standard above the sleeve; and a spring coiled about the standard and connected at its ends to the collar and bearing respectively, the spring being under tension tending to unwind the same in a selected direction so as to yieldably exert pressure on the sleeve tending to rotate it in the same direction, the collar being rotatably adjustable upon said one standard for adjusting the tension of the spring, and including a set screw engaging the standard in each position of rotary adjustment of the collar to fix the collar to the shaft standard.

5. In a mower of the tractor-attached type, a cutting mechanism mounting comprising: a ground-engaging runner; standards extending upwardly therefrom for supporting the runner from a tractor; a sleeve receiving and rotatable upon one of the standards; a bearing rigid with and disposed normally to the sleeve; a shaft extending through the bearing; a sleeve member receiving and rotating upon the shaft; means rigid with the sleeve member for fixedly attaching a cutting mechanism thereto; a collar fixed to the standard above the sleeve; and a spring coiled about the standard and connected at its ends to the collar and bearing respectively, the spring being under tension tending to unwind the same in a selected direction so as to yieldably exert pressure on the sleeve tending to rotate it in the same direction, the collar being formed with a depending shoulder, the sleeve being formed at its upper end with a shoulder engaging the first shoulder to limit rotation of the sleeve in opposite directions, the shoulders being arcuately shaped and being concentrically related, the shoulders being curved about equal radii, the first shoulder extending through approximately ninety degrees and the second shoulder extending through approximately one-hundred and eighty degrees, thus to limit rotation of the sleeve in either direction to approximately ninety degrees.

References Cited in the file of this patent

UNITED STATES PATENTS

| Number | Name | Date |
| --- | --- | --- |
| 57,871 | Crawford | Sept. 11, 1866 |
| 996,714 | Hatlee | July 4, 1911 |
| 1,275,599 | Reed | Aug. 13, 1918 |
| 1,475,206 | Trolley | Nov. 27, 1923 |
| 2,012,853 | Heitshu | Aug. 27, 1935 |
| 2,130,795 | Gollnick | Sept. 20, 1938 |
| 2,136,834 | Baird | Nov. 15, 1938 |
| 2,291,987 | Rogers | Aug. 4, 1942 |
| 2,314,216 | Hilblom | Mar. 16, 1943 |
| 2,358,539 | Smith | Sept. 19, 1944 |
| 2,457,693 | Leicy | Dec. 28, 1948 |
| 2,568,931 | Paul | Sept. 25, 1951 |
| 2,569,389 | Seaholm | Sept. 25, 1951 |